United States Patent Office 2,871,625
Patented Feb. 3, 1959

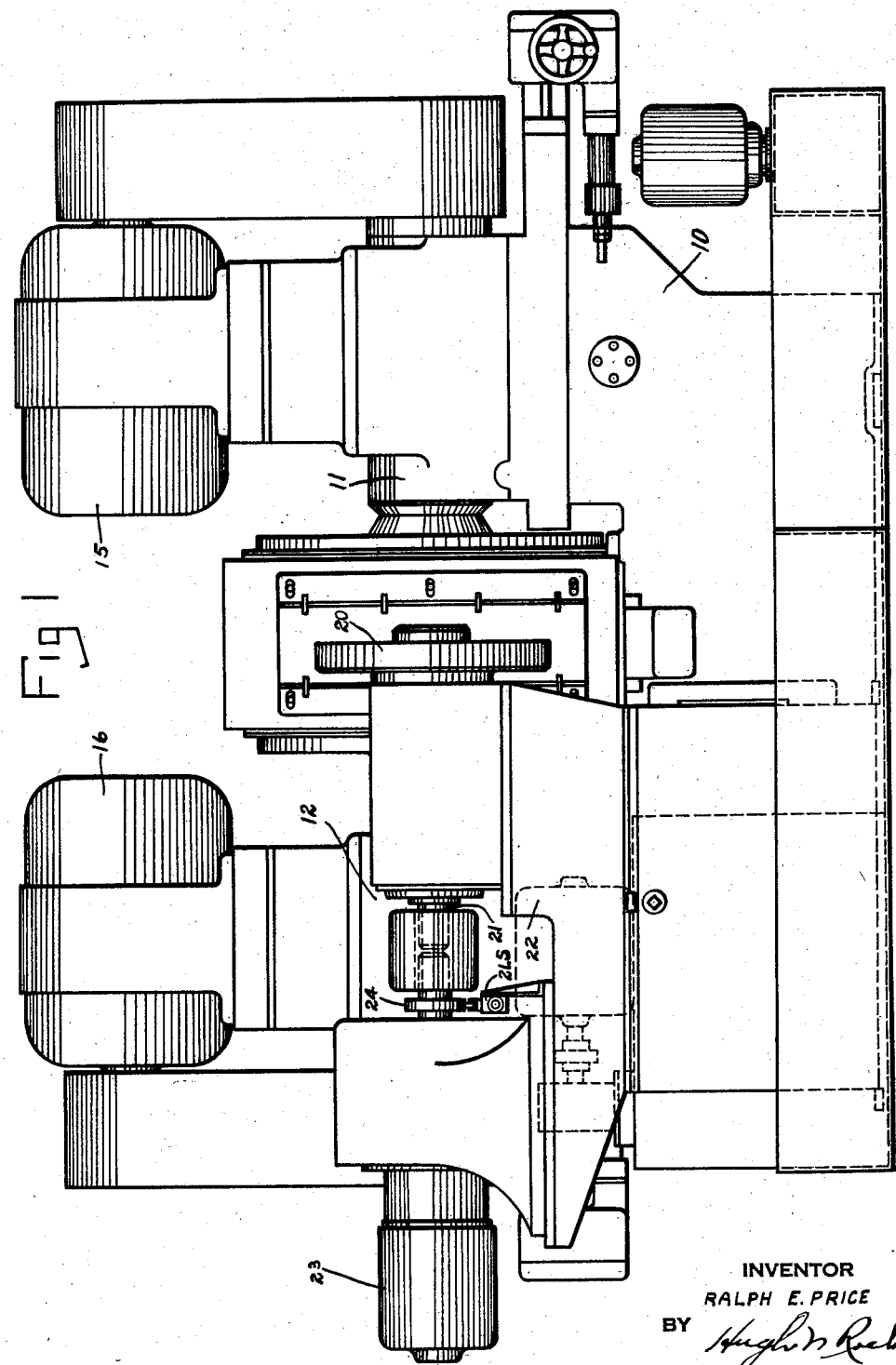

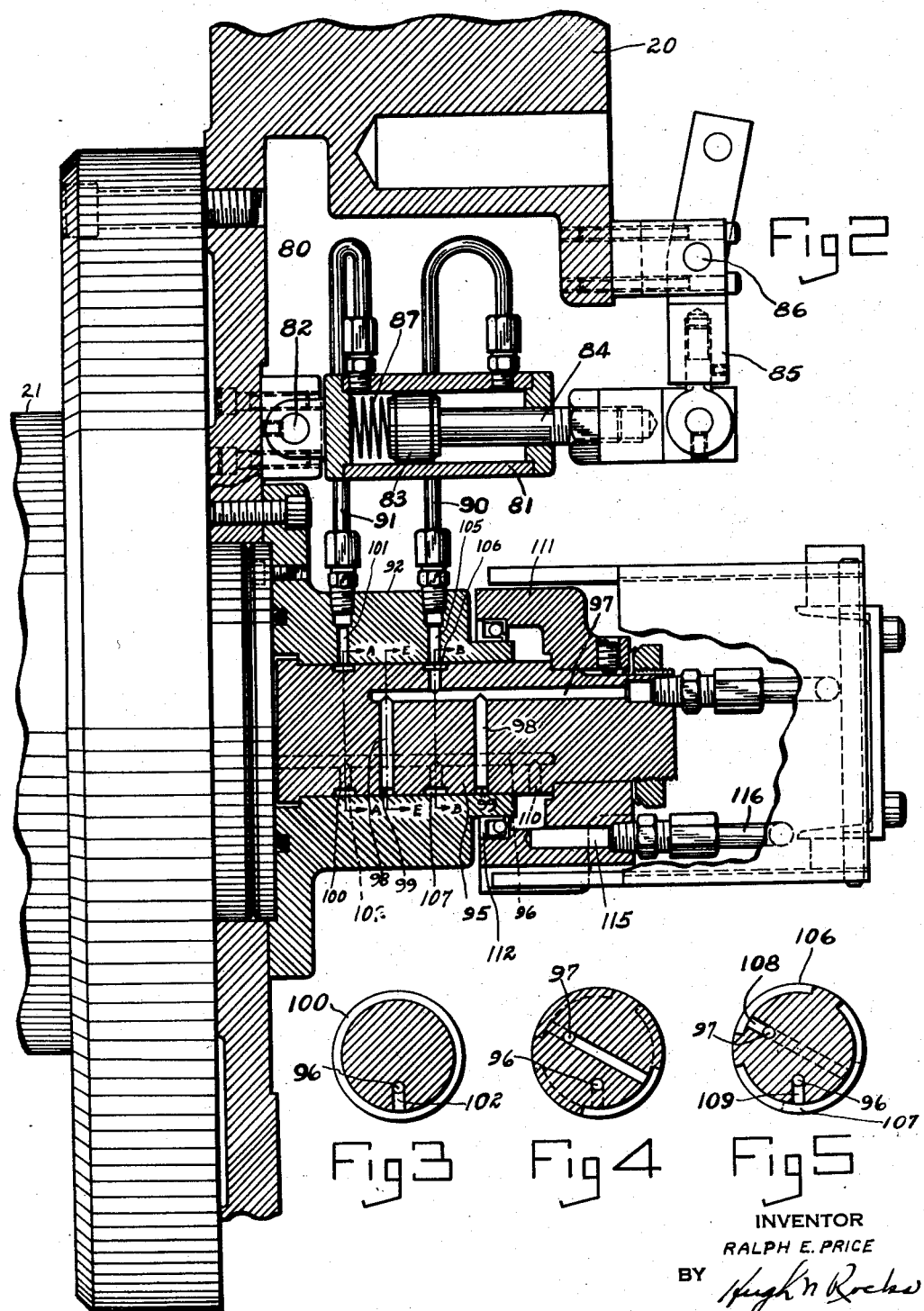

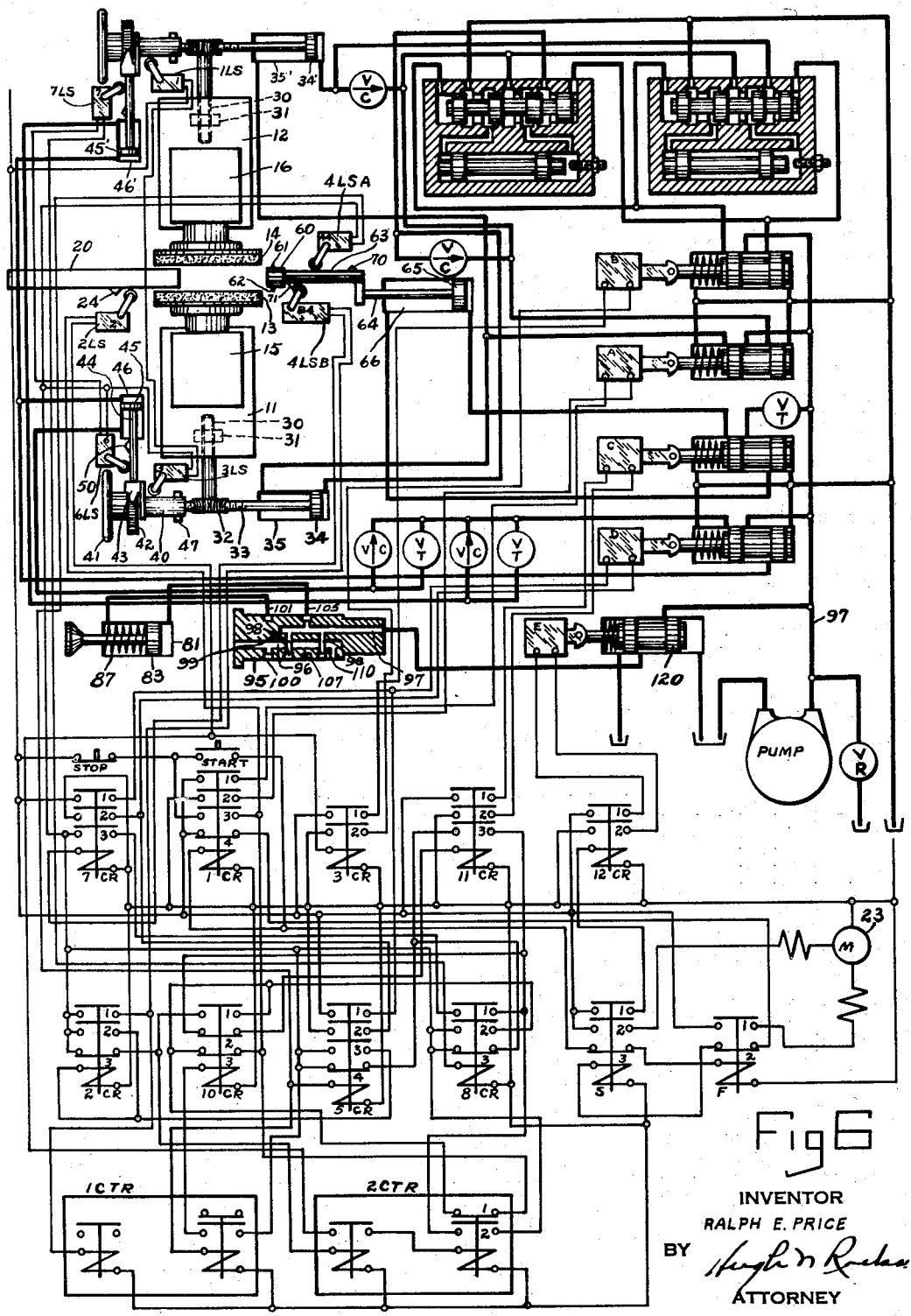

2,871,625

SURFACE GRINDING MACHINE

Ralph E. Price, Beloit, Wis., assignor to Gardner Machine Company, Beloit, Wis.

Application March 31, 1955, Serial No. 498,242

7 Claims. (Cl. 51—118)

This invention relates to surface grinding machines of the type known as disc grinders, particularly those having opposed annular faced grinding wheels for grinding both sides of a work piece simultaneously.

One of the problems involved in grinding on a machine of this type is that of removing the same amount of stock from both sides of a work piece. This problem arises from the fact that the two grinding wheels do not wear at the same rate. As a result, unless periodic adjustments are made, the point could be reached where the work could be ground to the desired thickness with practically all the stock removed from one side of the work piece. Since the design of many work pieces requires that a center line be maintained, it is necessary for the operator to make frequent measurements of the work and adjustments of the wheel feed in order to grind equally on both sides of the work piece. Thus, a great deal of time is lost in measuring and adjusting which could otherwise be used for grinding.

It is therefore an object of this invention to provide means for automatically maintaining the faces of the grinding wheels at equal distances from the center line of the work piece.

A further object is to provide means for intermittently feeding the grinding wheels at predetermined intervals.

A further object is to provide a dressing device having oppositely positioned diamonds spaced to dress both wheels simultaneously when the wheels are at the forward limit of their movement.

A further object is to provide means whereby a dressing operation may be performed on the opposed wheels while workpieces remain in the carrier.

A further object is to provide a dresser having oppositely positioned diamonds spaced a predetermined distance greater than the finished size of the work piece so that after the dressing operation the face of each wheel will be the same distance from the center line of the work regardless of any difference in the wear on each wheel.

A further object is to actuate a preset counter at each pass of the dresser across the grinding wheel and at the same time to feed each wheel in a predetermined amount.

A further object is to use the above mentioned counter to initiate operation of a second counter which determines the number of revolutions of the work table after the dressing operation.

A further object is to provide a hydraulic clamp for each work piece.

A further object is to provide a valve for actuating said clamps which function in timed relation with change in speed of rotation of the work table to open each clamp as it passes the loading position during the loading portion of the cycle and which causes the clamps to remain closed as they pass through the loading position during the grinding portion of the cycle.

In the drawings:

Figure 1 is a front elevation of a horizontal double spindle disc grinder.

Figure 2 is a front elevation partly in section of one of the clamping devices on the carrier of said disc grinder.

Figure 3 is a section on the line AA of Figure 2.

Figure 4 is a section on the line EE of Figure 2.

Figure 5 is a section on the line BB of Figure 2.

Figure 6 is a hydraulic and electrical diagram.

In Figure 1 numeral 10 indicates the bed of the machine, numerals 11 and 12 wheel supports which are slidable axially toward and from one another. Grinding wheels 13 and 14 are rotatably supported in bearings in support members 11 and 12 respectively. Said wheels are driven by motors 15 and 16 mounted on supports 11 and 12 respectively.

Work pieces may be supported on the carrier 20 in a manner which will be described later. On the spindle 21 rotatably mounted in spaced bearings on a support member 22, said spindle and carrier are driven by motor 23. A cam 24 on said spindle actuates a limit switch 2LS, the function of which will be described. The means for effecting axial adjustment of said wheels toward and from one another is the same for both wheels and therefore only one will be described in detail. The mechanism consists of a feed screw 30 rotatably mounted in a nut 31 in wheel support 11. At the outer end of said feed screw is a worm wheel 32, said worm wheel is in mesh with a worm (now shown) on piston rod 33. One end of said rod is attached to a piston 34 slidably mounted in cylinder 35. The opposite end of said piston rod is connected to a shaft 40 which may be rotated by hand wheel 41 or by ratchet 42 and pawl 43. Said pawl is mounted on one end of a piston rod 44, on the other end of which is a piston 45 slidably mounted in cylinder 46. A limit switch 3LS is actuated by a dog 47 movable with piston 34. Limit switch 3LS is in series with a corresponding limit switch 1LS. The remainder of the circuit and the function of the switch will be described later.

A dog 50 on piston rod 44 actuates 6LS with each stroke of pawl 43. 6LS is in series with the corresponding switch 7LS on the other wheel support 12.

The means for dressing grinding wheels 13 and 14 consists of a diamond head 60 having oppositely positioned diamonds 61 and 62, the points of which are spaced a distance slightly greater than the finish size of the workpiece. With this arrangement, a dressing tool can be passed across a grinding wheel without retracting said wheel and thus introducing possible errors in the positioning of said wheels due to backlash between feed screw 30, nut 31 and other parts of the feed mechanism. Said head 60 is attached to a sliding bar 63 which in turn is attached to piston rod 64 on piston 65. Said piston is slidably mounted in cylinder 66. A cam 70 on one side of bar 63 actuates a limit switch 4LS-A when the diamond head 60 is at the extended position of its stroke. The cam 71 on the other side of the bar 63 actuates a limit switch 4LS-B when the diamond head 60 is at the retracted position of its stroke. The circuits in which these switches are connected and their function will be described later.

The means for holding workpieces in carrier 20 consists of a series of peripherally spaced hydraulic clamping devices, one of which is shown in Figure 2.

A recess 80 is formed in said carrier near the center of rotation and a cylinder 81 is pivotally attached to said carrier at 82. The piston 83 in said cylinder has a piston rod 84 pivotally attached to one end of a lever 85 which in turn is pivotally mounted at 86 on the carrier. The other end of the lever 85 is adapted to receive a clamping member (now shown) adapted to the particular workpiece to be held in the carrier. Conduits 90 and 91 are connected to opposite ends of said cylinder and also to a valve housing 92 which is rotatable with said carrier. Fluid under pressure is supplied to the right end of said cylinder to move piston 83 to the left to release a work piece. Clamping action is effected by a spring 87 which urges piston 83 to the right. Conduit 91 serves only as a drain for fluid which leaks past piston 83. The means for directing fluid under pressure to conduit 90 is a stationary valve member 95 about which housing 92 rotates. Extending axially through said valve member 95 are an exhaust passage member 96 and a pressure passage 97. A peripheral groove 100 extends around said valve member in line with port 101 leading to conduit 91. Said groove is connected to exhaust passage 96 by a radial passage 102. In line with port 105 leading to conduit 90 are peripherally spaced grooves 106 and 107 in valve member 95. The extent of each of said grooves is shown in Figure 5. Groove 106 is connected to pressure passage 97 by radial passage 108. Groove 107 is connected to exhaust passage 96 by radial passage 109. Exhaust passage 96 is opened at the left end of valve member 95 to drain off any fluid which may collect at this point. The other end of said exhaust passage extends beyond housing 92 and is connected through radial passage 110 to an exhaust chamber formed between a cap member 111 and valve housing 92. Said cap member overlaps a portion of said valve housing, and a packing ring 112 between said overlapping portions prevents escape of exhaust fluid. An exhaust passage 115 is connected to said chamber at one end and at the other end to a conduit 116 which returns exhaust fluid to a reservoir (not shown).

Also connected to pressure passage 97 are axially spaced radial passages 98 leading to partial grooves 99. These passages are spaced angularly 180° from passage 105 so that pressure is equalized on the opposite sides of the valve member 95 with a corresponding elimination of friction which would otherwise exist between rotatable housing 92 and stationary valve member 95.

By mounting all the elements of the clamping fixture on the carrier and supplying fluid under pressure through a flexible connection to operate said clamp, all the forces involved in the operation of the clamp are self-contained and are not exerted between the carrier and a stationary part of the machine. This arrangement eliminates any deflection of machine parts due to clamping and thus increases the accuracy of the grinding operation.

Work is loaded with the carrier turning at slow speed.

Slow speed relay S is energized through normally closed 1CR4. When the slow speed relay S is energized contact 2 thereof is closed, energizing 12CR. 12CR, when energized, closes contacts 1 and 2 shifting the work clamping valve 120 to supply fluid under pressure to the clamp collector valve 95 from which it is distributed to each clamp cylinder 81 as the carrier rotates bringing the respective clamping stations into the loading zone. After all stations are loaded, the cycle start button is closed by the operator which energizes 1CR opening 1CR4 and de-energizing the slow speed relay through normally closed contact 1 of the fast speed relay F. Slow speed relay contact 3 closes completing a circuit from the cycle start switch to the fast speed relay. 1CR1 completes a circuit through 10CR3 and normally closed contact 3 of the slow speed relay, to hold the fast speed relay. This circuit causes the carrier motor 23 to drive the carrier at grinding speed.

Contact 2 of S opens de-energizing 12CR. 12CR1 and 2 open to de-energize solenoid E of clamp valve 120 to shut off fluid and connect pressure passage 97 with exhaust. Springs 87 will then close all the clamps. Closing of 1CR1 and 2 energizes solenoid A which releases the feed resetting pressure.

At each rotation of the carrier, 2LS is closed to energize 3CR which in turn energizes valve solenoid B to direct a measured amount of fluid to each of the cylinders 35 and $35^1$ to provide an incremental feed of the grinding wheels. At a predetermined point in the feeding movement of the two wheels 3LS is actuated by 35 and 1LS is actuated by $35^1$. These two switches are in series and complete a circuit to energize the clutch of counter 2CTR through normally closed contact 2CR3. The counter counts a predetermined number of revolutions and then completes a circuit through 2CTR1 and normally closed 10CR2 to energize 11CR.

11CR3 closes providing a holding circuit through previously closed 1LS and 3LS and normally closed 8CR3 or 5CR4 and 11CR1 and normally closed 10CR2.

11CR1 and 2 close, energizing dresser valve solenoid C which shifts to direct fluid under pressure to the head end of dresser cylinder 66 causing the dresser to move between the two grinding wheels dressing both wheels simultaneously. The two diamonds spaced a distance greater than the finished size of the work may remove the same or different amounts of abrasive from each of the grinding wheels depending upon the rate of wear of each wheel.

4LS-A is closed by the inward movement of the dressing tool and energizes 5CR. 5CR1 and 2 are closed energizing the ratchet feed valve solenoid D.

5CR3 completes a circuit to energize 2CR which is held by previously closed 1LS and 3LS through 2CR2. 2CR3 energizes the count coil of 2CTR to count strokes of the dresser.

Energizing valve solenoid D directs fluid to head ends of ratchet cylinders 46 and $46^1$ to actuate the wheel feeding mechanism to compensate for the change in position of the wheel surface due to dressing. 6LS and 7LS are closed in series by the action of the ratchet piston energizing 8CR.

With the opening of the normally closed pole 8CR3, the holding circuit to 11CR is broken and the dresser valve solenoid C is de-energized. Fluid is now directed to the rod end of the dresser cylinder 66 to return the dresser tool to starting position. 4LSB is closed by this return movement. The closing of 4LSB energizes relay 7CR which energizes the ratchet feed valve solenoid D causing a second action of the feed compensating ratchets to again advance the wheels by a total amount equal to oversize setting of the diamonds. Operation of the ratchet pistons 45 and $45^1$ again closes 6LS and 7LS in series energizing 8CR. With 7CR3 closed, the closing of 8CR3 energizes 11CR through the normally closed contact 10CR2 causing the dressing cycle previously described to be repeated.

After a predetermined number of passes of the dressing tool 1CTR counts out energizing 10CR. 10CR2 opens preventing repeat energization of 11CR.

Closing of 10CR1 again energizes clutch coil of 2CTR and 2LS again causes 2CTR to count each revolution of the carrier. When 2CTR counts out, 2CTR2 is opened de-energizing relay 1CR and the fast speed relay.

1CR4 and F2 close, energizing slow speed relay S.

Work carrier slows down. 12CR is energized to shift valve solenoid E to direct fluid to the clamp valve to open each clamp as it passes through loading position.

I claim:

1. In a machine of the kind described having grinding wheels with annular opposed operative surfaces, a carrier for moving work pieces between and in contact with said grinding wheels, means for maintaining the operative surfaces of said wheels equally spaced from a predetermined fixed center line comprising a dressing tool having oppositely positioned diamonds for dressing said wheels, each of which is equally spaced from said center line, the space between said diamonds being a predetermined amount greater than the finished size of a work piece, means operable to pass said dressing tool across said wheels while said wheels remain in grinding position and means operable thereafter to advance each of said wheels by equal amounts, the sum of which is equal to the difference between the spacing of the diamonds and the thickness of the work piece whereby to adjust said grinding wheels to a position for grinding the work to the desired thickness.

2. In a grinding machine of the type having annularly opposed abrading surfaces, a rotatable carrier member for presenting work pieces to said abrading surfaces, means for rotating said carrier at a slow speed for loading and a fast speed for grinding, self-contained pressure clamping devices angularly spaced on said carrier, means for opening each of said clamping fixtures when it is in a predetermined position of the carrier rotation while said carrier is rotating at slow speed, and means for maintaining said clamps closed in all positions of the carrier rotation during fast speed.

3. In a grinding machine of the type having annularly opposed abrading surfaces, a rotatable carrier member for presenting work pieces to said abrading surfaces, means for rotating said carrier at a slow speed for loading and a fast speed for grinding, clamping devices angularly spaced on said carrier, and means for opening each of said clamping fixtures when in a predetermined position of carrier rotation during rotation at slow speed, and means for maintaining said clamps closed in all positions of the carrier rotation during fast speed.

4. In a grinding machine of the type having annularly opposed abrading surfaces, a rotatable carrier member for presenting work pieces to said abrading surfaces, means for rotating said carrier at a slow speed for loading and a fast speed for grinding, self-contained pressure clamping devices angularly spaced on said carrier and means for opening each of said clamping fixtures when in a predetermined position of carrier rotation during rotation at slow speed, means for maintaining said clamps closed in all positions of the carrier during fast speed, said clamps being opened by pressure and closed by a spring, a valve for directing fluid under pressure to open said clamps and means for closing said valve when said carrier is operated at high speed.

5. In a grinding machine, grinding wheel supports, grinding wheels rotatably mounted thereon in annularly opposed relation, a work support, means for rotatably supporting work pieces thereon, means for effecting relative longitudinal movement between said work support and said grinding wheel supports whereby to subject the work pieces to the action of the grinding wheels, including a feed screw and nut for each grinding wheel, means for effecting a relative incremental feeding movement during a grinding operation including means for advancing said screws axially, a dressing device having diamonds spaced a predetermined amount greater than the thickness of the workpiece and means for effecting a relative traverse movement between said dressing device and said grinding wheels, means to actuate said feeding means incremently during the operation of the dressing device including means to effect relative rotation between said screws and nuts for advancing the wheels to compensate for the difference between the spacing of the diamonds and the thickness of the workpiece.

6. In a grinding machine, grinding wheel supports, grinding wheels rotatably mounted thereon in annularly opposed relation, a work support, means for supporting work pieces thereon, means for effecting a relative longitudinal movement between said work support and said grinding wheel support whereby to subject work pieces to the action of the grinding wheels, a dressing device and means for actuating same to dress said grinding wheel, a control device for determining the number of passes between the work support and the grinding wheel, and means actuated by said control device after a predetermined number of passes for effecting operation of said dressing device, means including a second control device operable after a predetermined number of passes of said dressing device to stop said dressing operation and actuate said first control device whereby to determine the number of passes between the work and the wheel after the dressing operation.

7. The method of dressing a pair of opposed abrasive discs which consists in alowing said discs to remain in the position to which they have advanced for a grinding operation, passing a dressing tool between said wheels to provide opposed abrasive surfaces which are equally distant from a predetermined center line and which are spaced from one another by a predetermined amount greater than the finished size of a workpiece, and then advancing each of said wheels by equal amounts to reduce the spacing between said wheels to the finished size of a workpiece.

References Cited in the file of this patent

UNITED STATES PATENTS

| 1,670,111 | Gardner | May 15, 1928 |
| 1,965,020 | Young | July 3, 1934 |

FOREIGN PATENTS

| 615,492 | Great Britain | Jan. 6, 1949 |